United States Patent [19]

Reeds, III et al.

[11] Patent Number: 5,153,919

[45] Date of Patent: Oct. 6, 1992

[54] SERVICE PROVISION AUTHENTICATION PROTOCOL

[75] Inventors: James A. Reeds, III, New Providence; Philip A. Treventi, Murray Hill, both of N.J.

[73] Assignee: AT&T Bell Laboratories, Murray Hill, N.J.

[21] Appl. No.: 759,311

[22] Filed: Sep. 13, 1991

[51] Int. Cl.$^5$ ............................................. H04L 9/00
[52] U.S. Cl. ........................................ 380/44; 380/21; 380/23
[58] Field of Search ........................ 380/23, 25, 21, 44

[56] References Cited

U.S. PATENT DOCUMENTS

| | | | |
|---|---|---|---|
| 4,555,805 | 11/1985 | Talbot | 380/23 |
| 4,658,093 | 4/1987 | Hellman | 380/25 |
| 4,811,377 | 3/1989 | Krolopp et al. | 380/23 |
| 4,995,083 | 2/1991 | Baker et al. | 380/23 |
| 5,077,790 | 12/1991 | D'Amico et al. | 380/23 |

*Primary Examiner*—Salvatore Cangialosi
*Attorney, Agent, or Firm*—H. T. Brendzel

[57] ABSTRACT

A protocol for authenticating a cellular telephone to a service provider for the purpose of preventing the piracy of cellular services. A service provider assigns a unique "secret", along with other information such as a telephone number, to each cellular telephone when the telephone service is established with the service provider. Each base station of a service provider continuously broadcasts a periodically changing random number to all of the cellular telephones within the base station's jurisdiction. When a cellular telephone first enters the jurisdiction of a base station, it registers itself with the base station by concatenating a secret password and the most recently broadcast random number, along with other information, and passing the concatenated information to a hash function. The cellular telephone then sends the output of the hash function, along with other identifying information to the service provider. The service provider, upon learning of the cellular telephone's identity, feeds the secret assigned to that cellular telephone and the random number, along with other information, into the same hash function. When the result of the hashing performed by the service provider matches that provided by the cellular telephone, authentication for that cellular telephone is complete. Thereupon, the provider sends the cell a shared secret data field which is known to the mobile unit, and subsequent authentication processes are carried out between the mobile unit and the cell itself.

39 Claims, 7 Drawing Sheets

SERVICE PROVISION AUTHENTICATION PROTOCOL

BACKGROUND OF THE INVENTION

This invention relates to authentication protocols and more particularly to protocols for insuring validity of communicating radio-telephones and the like.

In conventional telephony each telephone set (fax unit, modem, etc) is physically connected to a unique port on a switch at a local central office. The connection is through a dedicated wire, or through a designated channel on a dedicated wire. The wire connection is installed by the service provider (who, typically, is the common carrier) and, therefore, the service provider can be reasonably sure that transmission on the channel arrives from the subscriber. By comparison, authentication of a subscriber in wireless telephony is less certain.

Under the current cellular telephony arrangement in the United States, when a cellular telephone subscriber places a call, his or her cellular telephone indicates to the service provider the identity of the caller for billing purposes. This information is not encrypted. If an interloper eavesdrops at the right time, he or she can obtain the subscriber's identification information. This includes the subscriber's phone number and the electronic serial number (ESN) of the subscriber's equipment. Thereafter, the interloper can program his or her cellular telephone to impersonate that bona fide subscriber to fraudulently obtain services. Alternately, an interloper can inject himself into an established connection, overpower the customer's cellular telephone equipment by transmitting more power, and redirect the call to his or her purposes by sending certain control codes to the service provider. Basically, such piracy will succeed because the service provider has no mechanism for independently authenticating the identity of the caller at the time the connection is established and/or while the connection is active.

Technology is available to permit an eavesdropper to automatically scan all of the cellular frequencies in a given cell for such identification information. Consequently, piracy of cellular telephone services is rampant. Also, the lack of enciphering of the speech signals lays bare to eavesdroppers the content of conversations. In short, there is a clear and present need for effective security measures in the cellular telephony art, and that suggests the use of cryptology for the purposes of ensuring authentication and privacy.

Several standard cryptographic methods exist for solving the general sort of authentication problem that exists in cellular telephony, but each turns out to have practical problems. First, a classical challenge/response protocol may be used, based on a private key cryptographic algorithm. In this approach, a subscriber's mobile station is issued with a secret key which also known by the home system. When a serving system wishes to authenticate a subscriber, it applies to the home system for a challenge and a response to use with the given subscriber. The home system composes a random challenge and applies a one-way function to the challenge concatenated with the subscribers key to obtain the corresponding response. The challenge and response are supplied to the serving system, which issues the challenge to the mobile station. The mobile station in turn replies with the response, which it calculates from the challenge and from its stored secret key. The serving system compares the responses supplied by the home system and by the mobile station, and if they match, the mobile station is deemed authentic.

The problem with this approach is that often the serving system is unable to contact the home system quickly enough to allow authentication of a call setup, or that the database software on the home system is unable to look up the subscriber's secret key and compose the challenge/response pair quickly enough. Network or software delays of a second or two would add that much dead time till the subscriber hears a dial tone after picking up the handset when placing a call, and longer delays (given the control networks and switching apparatus currently used by cellular providers) would be common. In the present milieu, such delays are unacceptable.

Public key cryptography provides another standard class of ways for solving authentication problems. Generally speaking, each mobile station would be provided with a "public key certificate" of identity, signed by the public key of the service provider, stating that the mobile station is a legitimate customer of the service provider. In addition, each mobile would also be given secret data (private keys) which it can use, together with the certificate, to prove to third parties (such as the serving system) that it is a legitimate customer.

For example, service provider could have a pair of RSA keys, (F,G), with F private and G public. The service provider could supply each mobile with its own pair (D,E) of RSA keys, together with F(E) (the encryption of the mobile's public key E using the provider's private key F). Then a mobile asserts its identity by sending (E,F(E)) to the serving system. The serving system applies G to F(E) to obtain E. The serving system generates a challenge X, encrypts it with the mobile's public key E to obtain E(X) which it sends to the mobile. The mobile applies its private key D to E(X) to obtain X, which it sends back to the server in the clear as a response.

Although some variations on this theme involve less computation or data transmission than others, no public key authentication scheme yet exists which is efficiently executable in less than a second's time on the sort of hardware currently used in cellular telephones. Even though network connectivity between the serving and home systems is not needed at the moment of authentication, as it is in the classical approach, the same time constraints which rule out the classical approach also rule out the public key approach.

Another technique is proposed by R. M Needham and M. D. Schroeder in *Using Encryption for Authentication in Large Computer Networks*, Comm. of the ACM, Vol. 21, No. 12, 993-999 (Dec. 1978). In brief, the Needham-Schroeder technique requires that a third, trusted, party (AS) should serve as an authentication server which distributes session keys to the prospective parties (A and B) who are attempting to establish secure communications. The protocol is as follows: when party A wishes to communicate with party B, it sends to authentication server AS his own name, the name of party B and a transaction identifier. Server AS returns the name of party B, a session key, the transaction identifier and a message encrypted with B's key. All that information is encrypted with A's key. Party A receives the information, decrypts it, selects the portion that is encrypted with B's key and forwards that portion to party B. Party B decrypts the received messages and find it the name of party A and the session key. A last check (to prevent "replays") is made by party B issuing a challenge to party A and party A replies, using the session key. A match found at party B authenticates the identity of party A.

SUMMARY OF THE INVENTION

The security needs of cellular telephony are met with an arrangement that depends on a shared secret data field. The mobile unit maintains a secret that is assigned to it by the service provider, and generates a shared secret data field from that secret. The service provider also generates the shared secret data field. When a mobile unit enters the cell of a base station, it identifies itself to the base station, and supplies to the base station a hashed authentication string. The base station consults with the provider, and if it is determined that the mobile unit is a bona fide unit, the provider supplies the base station with the shared secret data field. Thereafter the mobile unit communicates with the base station with the assistance of authentication processes that are carried out between the mobile unit and the base station, using the shared secret data field.

One feature of this arrangement is that the various base stations do not have access to the secret that was installed in the mobile unit by the provider. Only the base stations which successfully interacted with the mobile unit have the shared secret data field; and that number can be limited by the provider simply by directing the mobile unit to create a new shared secret data field.

Another feature of this arrangement is that the more elaborate authentication process that utilizes the secret, which is more time consuming and which takes place only through involvement of the provider, occurs infrequently; when a mobile unit first enters the cell (or when it is suspected that the shared secret data field has been compromised).

Call originations, call terminations, and other functions are authenticated using essentially the same authentication protocol and the same hashing function. The few differences manifest themselves in the information that is hashed.

BRIED DESCRIPTION OF THE DRAWING

FIG. 1 illustrates an arrangement of network providers and cellular radio providers interconnected for service to both stationary and mobile telephones and the like;

DETAILED DESCRIPTION

Figure 1:
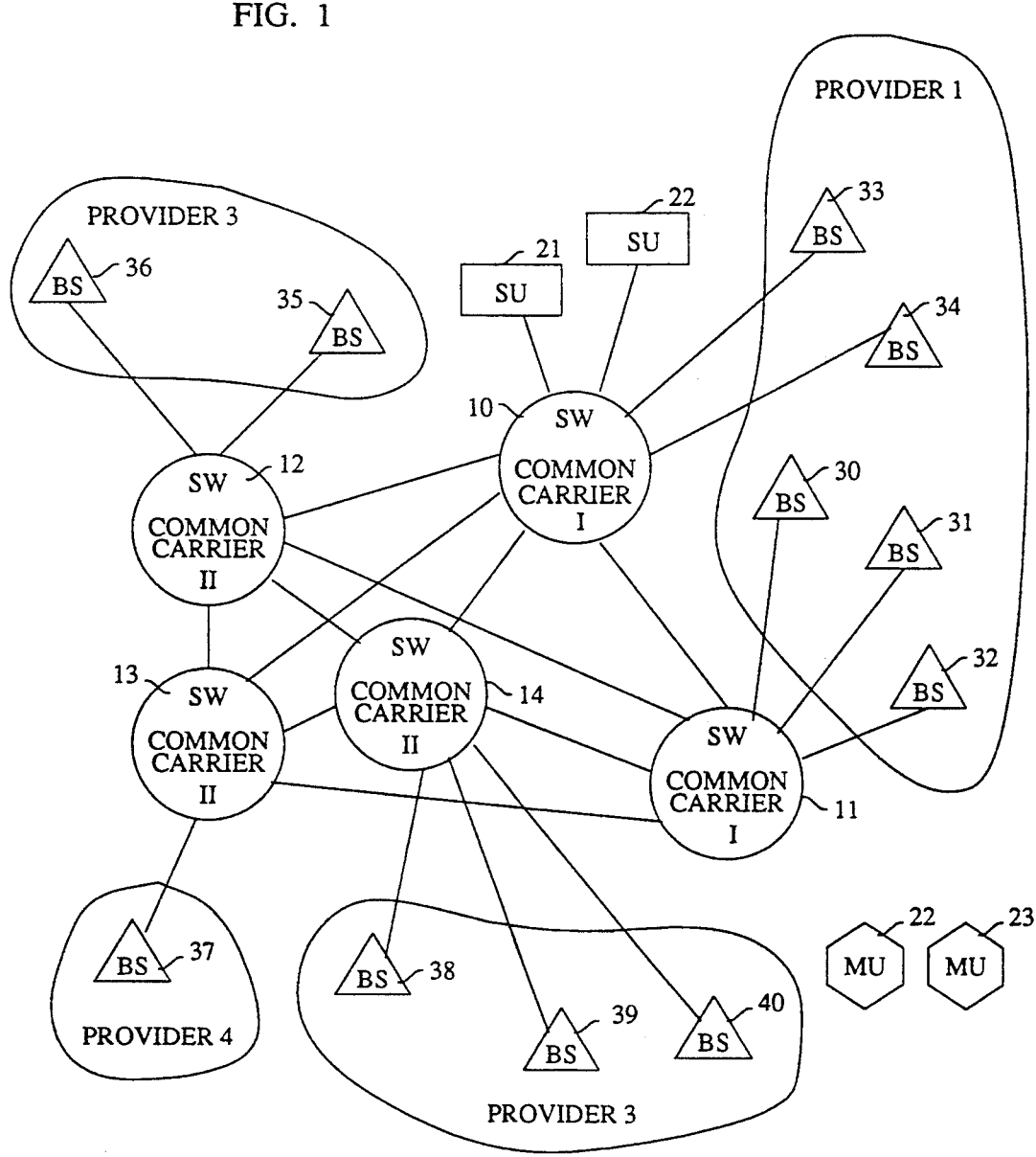

In a mobile cellular telephone arrangement there are many mobile telephones, a much smaller number of cellular radio providers (with each provider having one or more base stations) and one or more switching network providers (common carriers). The cellular radio providers and the common carriers combine to allow a cellular telephone subscriber to communicate with both cellular and non-cellular telephone subscribers. This arrangement is depicted diagrammatically in FIG. 1, where common carrier I and common carrier II combine to form a switching network comprising switches 10-14. Stationary units 20 and 21 are connected to switch 10, mobile units 22 and 23 are free to roam, and base stations 30-40 are connected to switches 10-14. Base stations 30-34 belong to provider 1, base stations 35 and 36 belong to provider 2, base station 37 belongs to provider 4, and base stations 38-40 belong to provider 3. For purposes of this disclosure, a base station is synonymous with a cell wherein one or more transmitters are found. A collection of cells makes up a cellular geographic service area (CGSA) such as, for example, base stations 30, 31, and 32 in FIG. 1.

Each mobile unit has an electronic serial number (ESN) that is unique to that unit. The ESN number is installed in the unit by the manufacturer, at the time the unit is built (for example, in a read-only-memory), and it is unalterable. It is accessible, however.

When a customer desires to establish a service account for a mobile unit that the customer owns or leases, the service provider assigns to the customer a phone number (MIN1 designation), an area code designation (MIN2 designation) and a "secret" (A-key). The MIN1 and MIN2 designations are associated with a given CGSA of the provider and all base stations in the FIG. 1 arrangement can identify the CGSA to which a particular MIN2 and MIN1 pair belongs. The A-key is known only to the customer's equipment and to the provider's CGSA processor (not explicitly shown in FIG. 1). The CGSA processor maintains the unit's ESN, A-key, MIN1 and MIN2 designations and whatever other information the service provider may wish to have.

With the MIN1 and the MIN2 designations and the A-key installed, the customer's unit is initialized for service when the CGSA processor sends to the mobile unit a special random sequence (RANDSSD), and a directive to create a "shared secret data" (SSD) field. The CGSA sends the RANDSSD, and the SSD field generation directive, through the base station of the cell where the mobile unit is present. Creation of the SSD field follows the protocol described in FIG. 2.

As an aside, in the FIG. 1 arrangement each base station broadcasts information to all units within its cell on some preassigned frequency channel (broadcast band). In addition, it maintains two way communications with each mobile unit over a mutually agreed, (temporarily) dedicated, channel. The manner by which the base station and the mobile unit agree on the communications channel is unimportant to this invention, and hence it is not described in detail herein. One approach may be, for example, for the mobile unit to scan all channels and select an empty one. It would then send to the base station its MIN2 and MIN1 designations (either in plaintext form or enciphered with a public key), permitting the base station to initiate an authentication process. Once authenticated communication is established, if necessary, the base station can direct the mobile station to switch to another channel.

As described in greater detail hereinafter, in the course of establishing and maintaining a call on a mobile telephony system of this invention, an authentication process may be carried out a number of times throughout the conversation. Therefore, the authentication process employed should be relatively secure and simple to implement. To simplify the design and lower the implementation cost, both the mobile unit and the base station should use the same process.

Many authentication processes use a hashing function, or a one-way function, to implement the processes. A hashing function performs a many-to-one mapping which converts a "secret" to a signature. The following describes one hashing function that is simple, fast, effective, and flexible. It is quite suitable for the authentication processes of this invention but, of course, other hashing functions can be used.

The Jumble Process

The Jumble process can create a "signature" of a block of d "secret" data words $b(i)$, with the aid of a k-word key $x(j)$, where d, i, j, and k are integers. The "signature" creation process is carried out on one data word at a time. For purposes of this description, the words on which the Jumble process operates are 8 bits long (providing a range from 0 to 255, inclusive), but any other word size can be employed. The "secret" data block length is incorporated in the saw tooth function $s_d(t) = t$ for $0 \leq t \leq d-1$ $s_d(t) = 2d-2-t$ for $d \leq t \leq 2d-3$, and $s_d(t) = s_d(t+2d-2)$ for all t.

This function is used in the following process where, starting with $z=0$ and $i=0$, for successively increasing integer values of i in the range $0 \leq 6d-5$, a) $b(s_d(i))$ is updated by:
$b(s_d(i)) = b(s_d(i)) + x(i_k) + SBOX(z) \mod 256$ where
$i_k$ is i modulo k, $SBOX(z) = y + [y/2048] \mod 256$,
$y = (z \oplus 16)(z+111)(z)$,
$[y/2048]$ is the integer portion of y divided by 2048, and $\oplus$ represents the bit-wise Exclusive-OR function; and b) z is updated with: $z = z + b(s_d(i)) \mod 256$.

It may be appreciated that in the process just described there is no real distinction between the data and the key. Therefore, any string that is used for authentication can have a portion thereof used as a key for the above process. Conversely, the data words concatenated with the key can be considered to be the "authentication string". It may also be noted that each word $b(i)$, where $0 \leq i < d$ is hashed individually, one at a time, which makes the hashing "in place". No additional buffers are needed for the hashing process per se.

The process just described can be easily carried out with a very basic conventional processor, since the only operations required are: shifting (to perform the division by 2048), truncation (to perform the [] function and the mod 256 function), addition, multiplication, and bit-wise Exclusive-OR functions.

Figure 2:
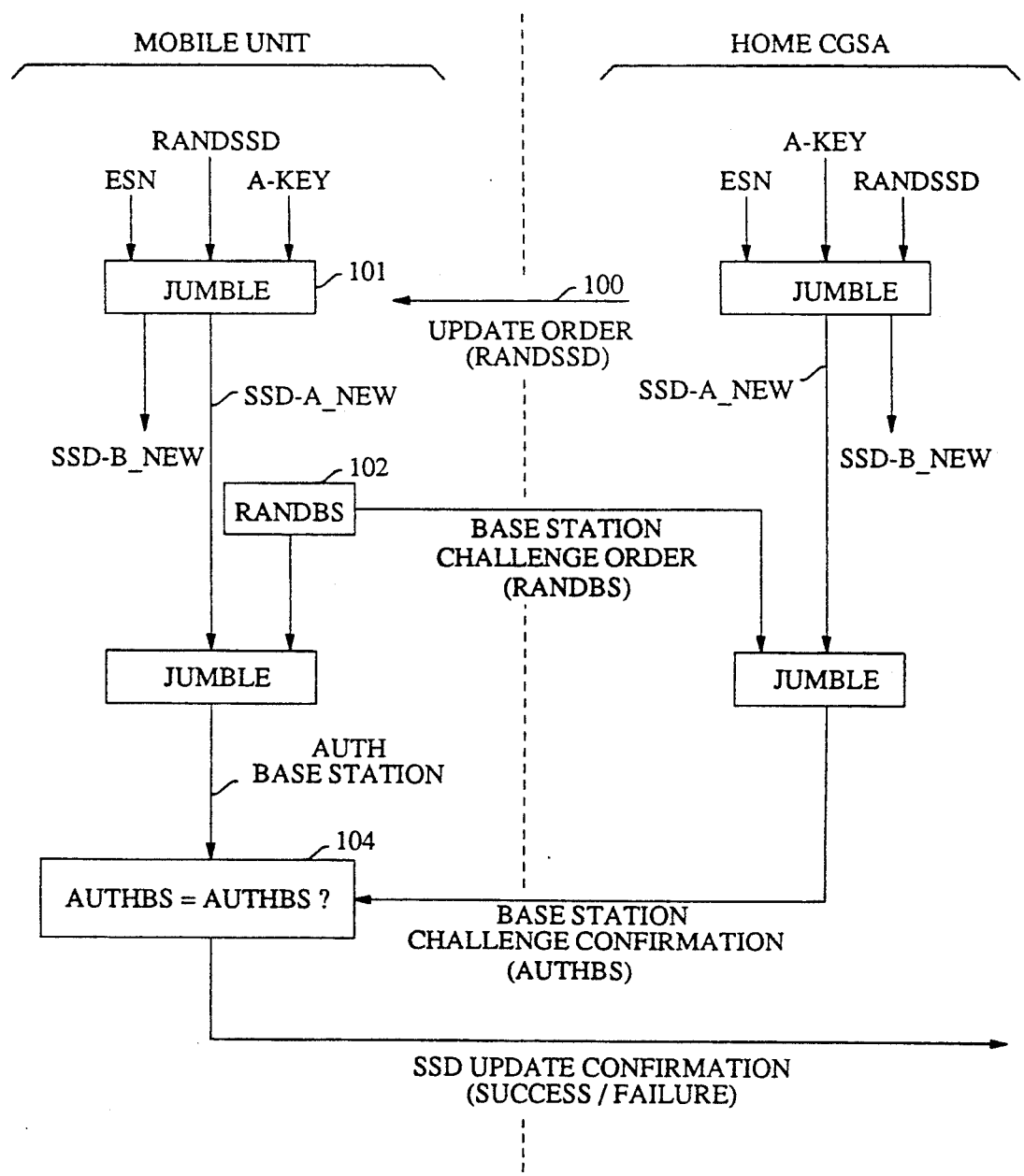
FIG. 2 depicts the process for directing the creation of a shared secret data field and the verification of same.
Figure 4:
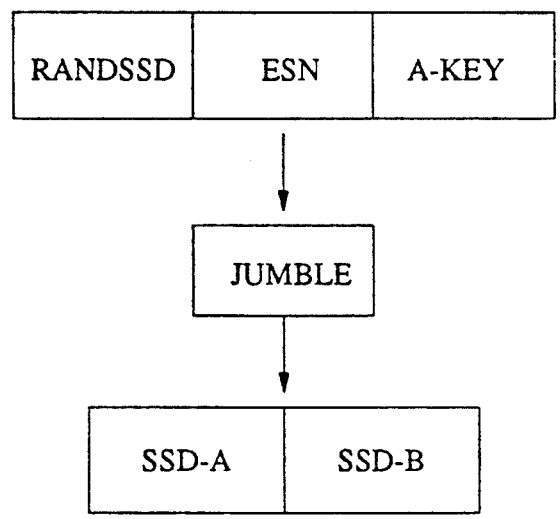
FIG. 4 shows the elements that are concatenated and hashed to create the shared secret data.

Returning to the SSD field initialization process of FIG. 2, when a RANDSSD sequence and the directive to create a new SSD field (arrow 100 in FIG. 2) are received by the mobile station, a new SSD field is generated in accordance with FIG. 4. The mobile unit concatenates the ESN designation, the A-key, and the RANDSSD sequence to form an authentication string. The authentication string is applied to Jumble block 101 (described above) which outputs the SSD field. The SSD field comprises two subfields: the SSD-A subfield which is used to support authentication procedures, and the SSD-B subfield which is used to support voice privacy procedures and encryption of some signaling messages (described below). It may be noted that a larger number of SSD subfields can be created; either by subdividing the SSD field formed as described above or by first enlarging the SSD field. To increase the number of bits in the SSD field one needs only to start with a larger number of data bits. As will be appreciated from the disclosure below, that is not a challenging requirement.

The home CGSA processor knows the ESN and the A-key of the mobile unit to which the received MIN2 and MIN1 designations were assigned. It also knows the RANDSSD sequence that it sent. Therefore, the home CGSA processor is in position to duplicate the SSD field creation process of the mobile unit. By concatenating the RANDSSD signal with the ESN designation and the A-key, and with the above-described Jumble process, the CGSA processor creates a new SSD field and partitions it into SSD-A and SSD-B subfields. However, the SSD field created in the home CGSA processor must be verified.

Figure 5:
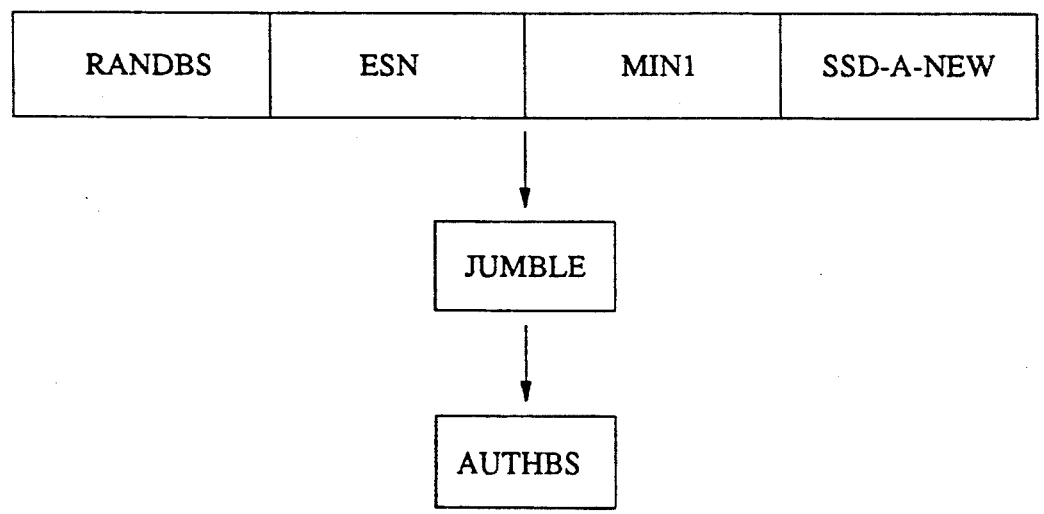
FIG. 5 shows the elements that are concatenated and hased to create the verification sequence.

In accordance with FIG. 2, verification of the created SSD field is initiated by the mobile unit. The mobile unit generates a challenge random sequence (RANDBS sequence) in block 102 and sends it to the home CGSA processor through the serving base station (the base station that serves the area in which the mobile unit is located). In accordance with FIG. 5, the home CGSA processor concatenates the challenge RANDBS sequence, the ESN of the mobile unit, the MIN1 designation of the mobile unit, and the newly created SSD-A to form an authentication string which is applied to the Jumble process. In this instance, the Jumble process creates a hashed authentication signal AUTHBS which is sent to the mobile station. The mobile station also combines the RANDBS sequence, its ESN designation, its MIN1 designation and the newly created SSD-A to form an authentication string that is applied to the Jumble process. The mobile station compares the result of its Jumble process to the hashed authentication signal (AUTHBS) received from the home CGSA processor. If the comparison step (block 104) indicates a match, the mobile station sends a confirmation message to the home CGSA processor indicating the success of the update in the SSD field. Otherwise, the mobile station reports on the failure of the match comparison. As an aside, it is possible that the serving system, acting as an agent for the home CGSA, could respond to the challenge from the mobile unit, if the home GCSA were to send a copy of the newly generated SSD-A to the serving system along with the RANDSSD sequence it used to create it.

Having initialized the mobile station, the SSD field remains in force until the home CGSA processor directs the creation of a new SSD field. That can occur, for example, if there is reason to believe that the SSD field has been compromised. At such a time, the home CGSA processor sends another RANDSSD sequence to the mobile unit, and a directive to create a new SSD field.

As mentioned above, in cellular telephony each base station broadcasts various informational signals for the benefit of all of the mobile units in its cell. In accordance with FIG. 1 management, one of the signals broadcast by the base station is a random or pseudorandom sequence (RAND sequence). The RAND sequence is used by various authentication processes to randomize the signals that are created and sent by the mobile units. Of course, the RAND sequence must be changed periodically to prevent record/playback attacks. One approach for selecting the latency period of a RAND signal is to make it smaller than the expected duration of an average call. Consequently, a mobile unit, in general, is caused to use different RAND signals on successive calls.

In accordance with one aspect of this invention, as soon as the mobile unit detects that it enters a cell it registers itself with the base unit so that it can be authenticated. Only when a mobile unit is authenticated can it initiate calls, or have the base station direct calls to it.

When the mobile unit begins the registration process it accepts the RAND sequence broadcast by the base station and, in turn, it sends to the serving base station its MIN1 and MIN2 designations and its ESN sequence (in plaintext) as well as a hashed authentication string. According to FIG. 6, the hashed authentication string is derived by concatenating the RAND sequence, the ESN sequence, the MIN1 designation and the SSD-A subfield to form an authentication string; and applying the authentication string to the Jumble process. The hashed authentication string at the output of the Jumble process is sent to the serving base station together with the ESN sequence.

In some embodiments, all or part of the RAND sequence used by the mobile unit is also sent to the serving base station (together with the ESN sequence and the MIN1 and MIN2 designations), because the possibility exists that the RAND value has changed by the time the hashed authentication string reaches the base station.

Figure 6:
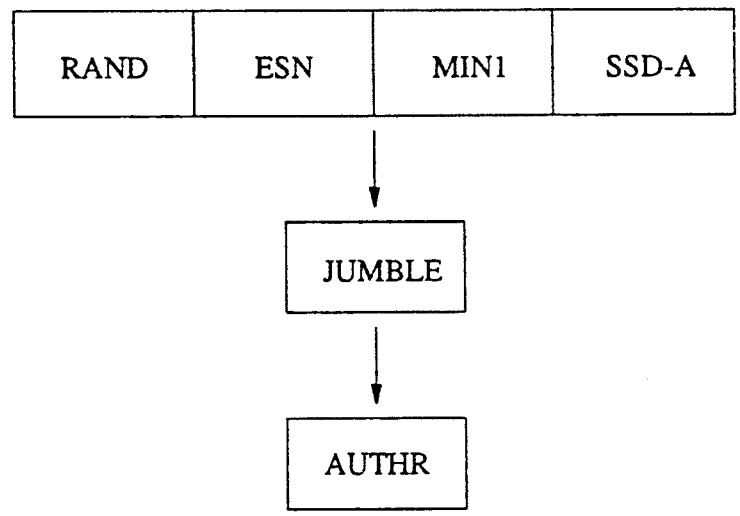
FIG. 6 shows the elements that are concatenated and hashed to create the registration sequence when the mobile unit goes on the air.

On the base station side, the serving base station knows the RAND sequence (because the base station created it) and it also knows the ESN and the MIN2 and MIN1 designations with which the mobile unit identified itself. But, the serving base station does not know the SSD field of the mobile unit. What it does know is the identity of the mobile unit's home CGSA processor (from the MIN1 and MIN2 designations). Consequently, it proceeds with the authentication process by sending to the mobile unit's home CGSA processor the MIN1 designation, the ESN sequence, the hashed authentication string that the mobile unit created and transmitted, and the RAND sequence that the serving base station broadcast (and which the mobile unit incorporated in the created hashed authentication string). From the mobile unit's MIN1 designation and ESN sequence the home CGSA processor knows the mobile unit's identity and, hence, the mobile unit's SSD-A subfield. Therefore it can proceed to create an authentication string just as the mobile unit did, and apply it to the Jumble process (FIG. 6). If the hashed authentication string created by the mobile unit's home CGSA processor matches the hashed authentication string created in the mobile unit and supplied by the serving base station, then verification is deemed successful. In such a case, the home CGSA processor supplies the serving base station with the unit's SSD field. As an aside, to keep the ESN designation and the SSD field secure, the communication between the base stations and the CGSA processor is carried in encrypted form.

Figure 3:
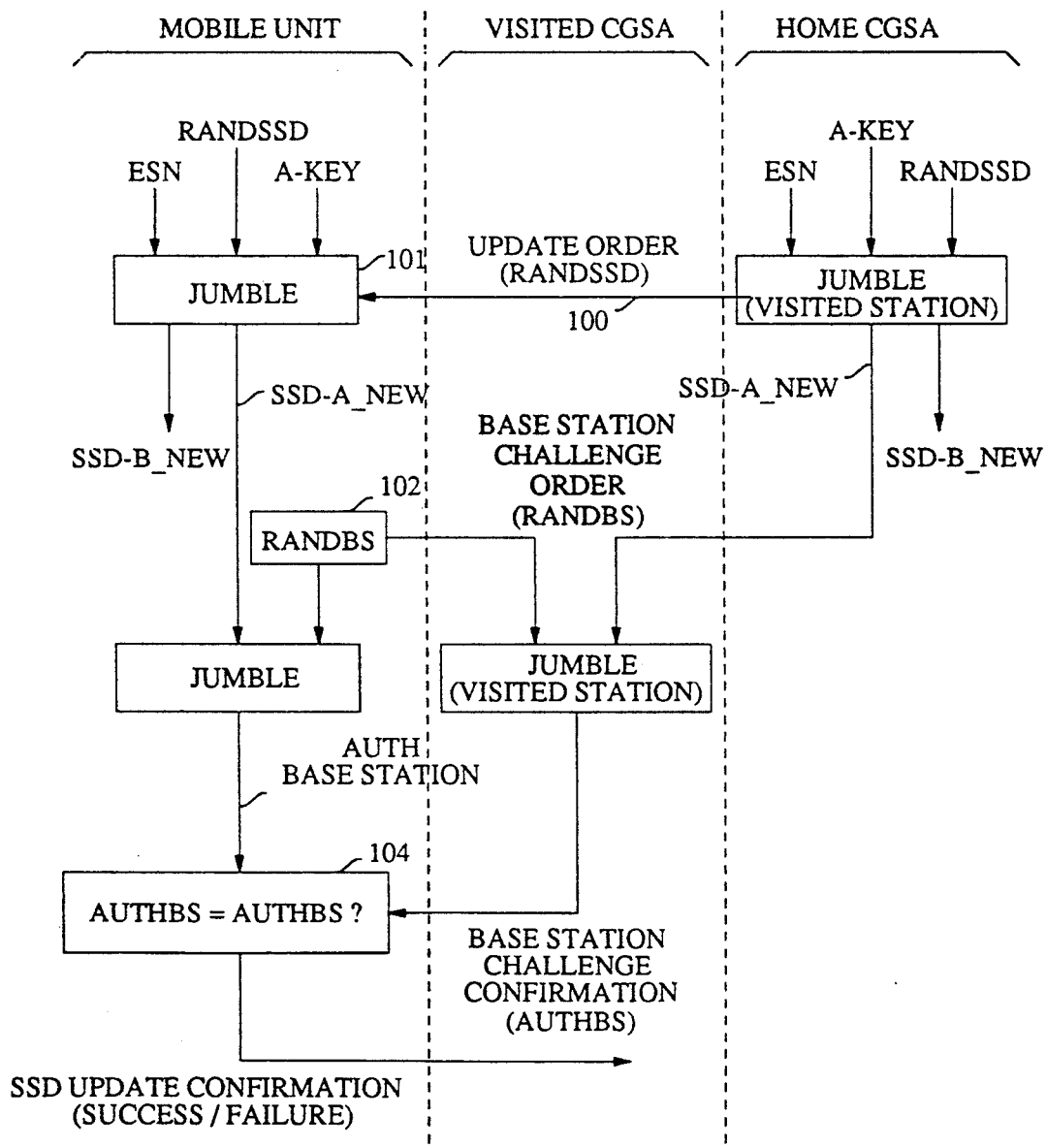
FIG. 3 depicts the registration process in a visited base station, for example, when the mobile unit first enters the cell serviced by the base station.

In the above-described protocol, the mobile unit's CGSA processor attempts to verify the validity of the hashed authentication string. When the verification is unsuccessful, the CGSA processor informs the serving base station that the mobile unit was not authenticated and may suggest that either the contact with the mobile unit be dropped or that the mobile unit be directed to retry the registration process. To retry the registration process the home CGSA processor can either continue participation in the authentication process or it can delegate it to the serving base station. In the latter alternative, the serving base station informs the home CGSA processor of the ESN sequence and the MIN1 designation of the mobile unit, and the CGSA processor responds with the SSD field of the mobile unit and the RANDSSD with which the SSD field was created. Authentication, in the sense of creating a hashed authentication string and comparing it to the hashed authentication string sent by the mobile unit, is then carried out by the serving base station. A retry directive can then be carried out without the home CGSA process by the serving station sending the RANDSSD to the mobile unit. This "registration" protocol is depicted in FIG. 3.

Once the mobile unit has been "registered" at the serving base station (via the above-described process) the serving base station possesses the ESN and the SSD field of the mobile unit, and subsequent authentication processes in that cell can proceed in the serving base station without reference to the home CGSA processor—except one. Whenever, for any reason, it is desirable to alter the SSD field, communication is effectively between the home CGSA processor and the mobile unit; and the serving base station acts only as a conduit for this communication. That is because creation of a new SSD field requires an access to the secret A-key, and access to the A-key is not granted to anyone by the CGSA processor. Accordingly, when a new SSD field is to be created and the mobile unit is not in the area of the home CGSA, the following occurs:

the home CGSA processor creates a RANDSSD sequence and alters the SSD field based on that RANDSSD sequence, the home CGSA processor supplies the serving base station with the RANDSSD sequence and the newly created SSD field, the serving base station directs the mobile unit to alter its SSD field and provides the mobile unit with the RANDSSD sequence, the mobile unit alters the SSD field and sends a challenge to the serving base station, the serving base station creates the AUTHBS string (described above) and sends it to the mobile unit, and the mobile unit verifies the AUTHBS string and informs the serving base station that both the mobile unit and the serving base station have the same SSD fields.

Figure 7:
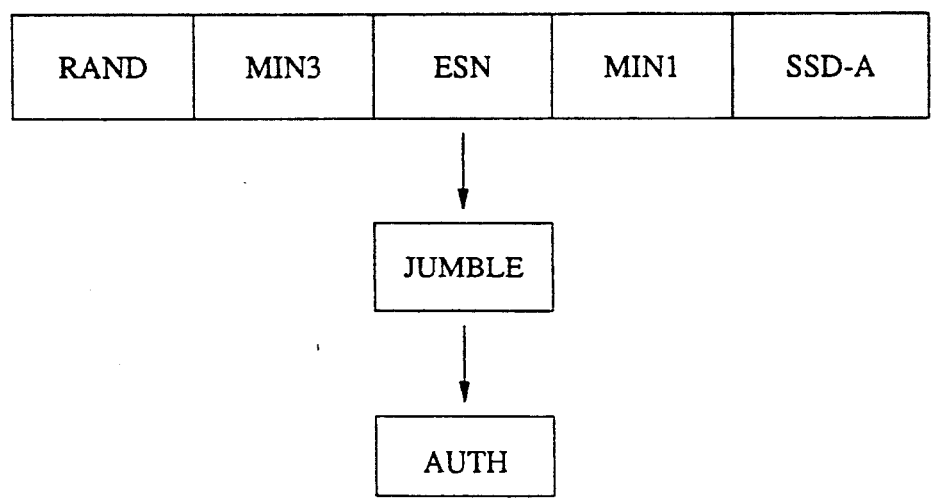
FIG. 7 shows the elements that are concatenated and hased to create the call initiation sequence.

Having been registered by the serving base station, the mobile unit can initiate calls with an authentication process as depicted in FIG. 7. The call initiation sequence concatenates signals RAND, ESN, SSD-A and at least some of the called party's identification (phone) number (MIN3 in FIG. 7). The concatenated signals are applied to the Jumble process to develop a hashed authentication sequence that can be verified by the serving base station. Of course, to permit verification at the serving base station, the called party's identification number must also be transmitted in a manner that can be received by the base station (and, as before, perhaps a portion of the RAND signal), i.e., in plaintext. Once the authentication sequence is verified, the base station can process the call and make the connection to the called party.

The protocol for connecting to a mobile unit when it is a "called party" follows the registration protocol of FIG. 6. That is, the serving base station requests the called mobile station to send an authentication sequence created from the RAND sequence, ESN designation, MIN1 designation and SSD-A subfield. When authentication occurs, a path is set up between the base station and the called party mobile unit, for the latter to receive data originating from, and send data to, the mobile unit (or stationary unit) that originated the call.

It should be noted that all of the authentications described above are effective only (in the sense of being verified) with respect to the authenticated packets, or strings, themselves. To enhance security at other times, three different additional security measures can be employed. They are speech encryption, occasional re-authentication, and control message encryption.

Speech Encryption

Figure 8:
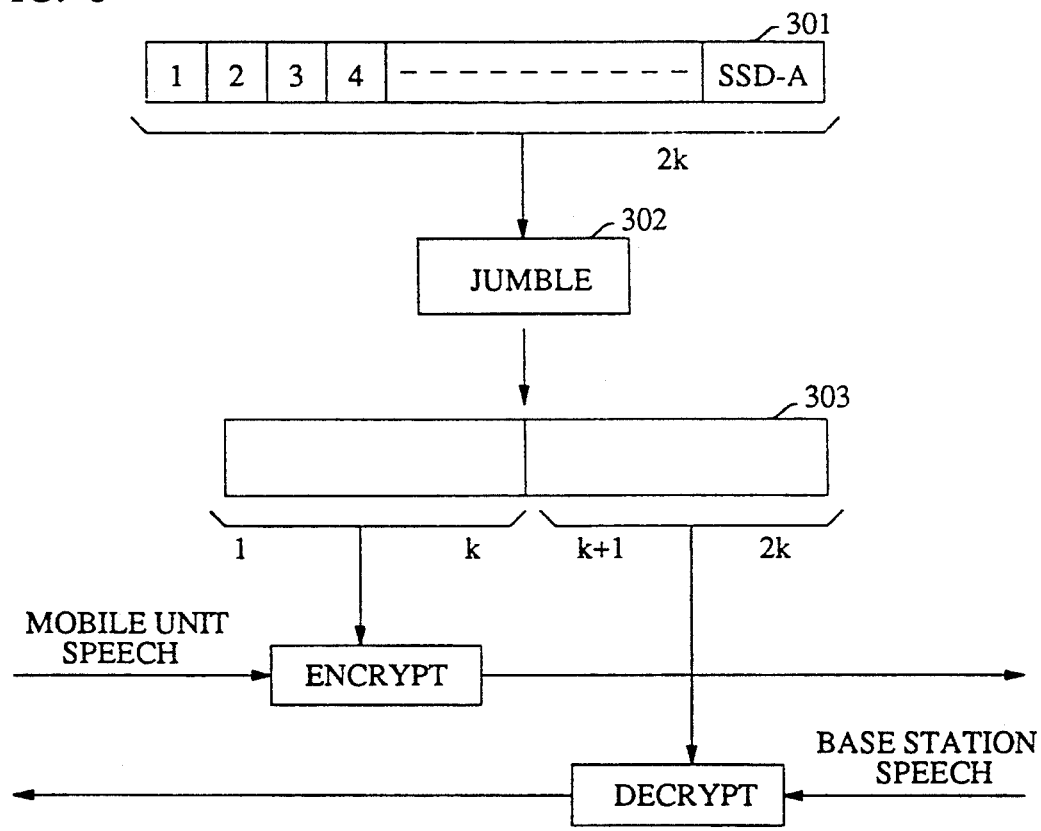
FIG. 8 depicts the speech encryption and decryption process in a mobile unit.

The speech signal is encrypted by first converting it to digital form. This can be accomplished in any number of conventional ways, with or without compression, and with or without error correction codes. The bits of the digital signals are divided into successive groups of K bits and each of the groups is encrypted. More specifically, in both the mobile unit and the base station the RAND sequence, the ESN and MIN1 designations, and the SSD-B subfield are concatenated and applied to the Jumble process. The Jumble process produces 2K bits and those bits are divided into groups A and B of K bits each. In the mobile unit group A is used for encrypting outgoing speech, and group B is used for decrypting incoming speech. Conversely in the base station, group A is used for decrypting incoming speech and group B is used for encrypting outgoing speech. FIG. 8 depicts the speech encryption and decryption process.

Re-authentication

Figure 9:
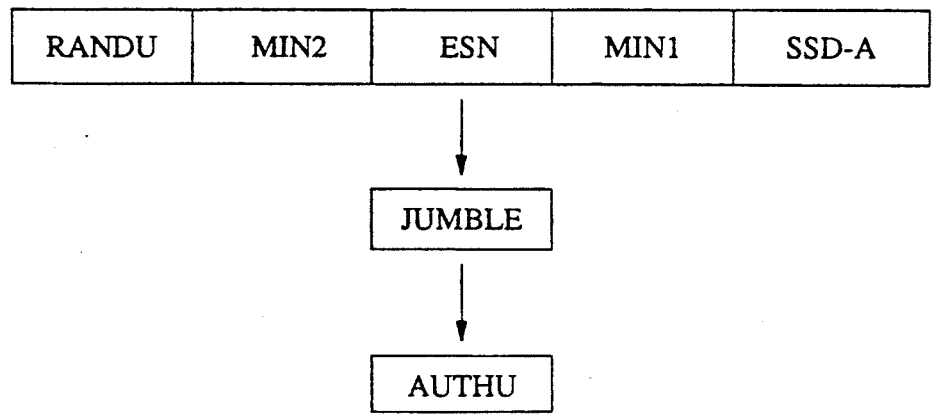
FIG. 9 shows the elements that are concatenated and hashed to create the re-authentication sequence.

At the base station's pleasure, a re-authentication process is initiated to confirm that the mobile unit which the base station believes is active, is, in fact, the mobile unit that was authorized to be active. This is accomplished by the base station requesting the mobile unit to send a hashed authentication sequence in accordance with FIG. 9. With each such request, the base station sends a special (RANDU) sequence. The mobile unit creates the hashed authentication sequence by concatenating the RANDU sequence, the area code MIN2 designation of the mobile unit, the ESN designation, the MIN1 designation and the SSD-A designation. The concatenated string is applied to the Jumble process, and the resulting hashed authentication string is sent to the base station. As an aside, the hashed sequence may also include the dialed digits so as to make the hijacking of the channel even more difficult. The base station, at this point, is in a position to verify that the hashed authentication string is valid.

Control Message Cryptosystem

The third security measure deals with ensuring the privacy of control messages. In the course of an established call, various circumstances may arise that call for the transmission of control messages. In some situations, the control messages can significantly and adversely affect either the mobile station that originated the call or the base station. For that reason, it is desirable to encipher (reasonably well) some types of control messages sent while the conversation is in progress. Alternately, selected fields of chosen message types may be encrypted. This includes "data" control messages such as credit card numbers, and call redefining control messages. This is accomplished with the Control Message Cryptosystem.

The Control Message Cryptosystem (CMC) is a symmetric key cryptosystem that has the following properties:

1) it is relatively secure,
2) it runs efficiently on an eight-bit computer, and
3) it is self-inverting.

The cryptographic key for CMC is an array, TBOX[z], of 256 bytes which is derived from a "secret" (e.g., SSD-B subfield) as follows:

1. for each z in the range $0 \leq z < 256$, set TBOX[z]=z, and
2. apply the array TBOX[z] and the secret (SSD-B) to the Jumble process.

This is essentially what is depicted in elements 301, 302 and 303 in FIG. 8 (except that the number of bits in FIG. 8 is 2K rather than 256 bytes).

Once the key is derived, CMC can be used to encrypt and decrypt control messages. Alternately, the key can be derived "on the fly" each time the key is used. CMC has the capability to encipher variable length messages of two or more bytes. CMC's operation is self-inverting, or reciprocal. That is, precisely the same operations are applied to the ciphertext to yield plaintext as are applied to plaintext to yield ciphertext. Thus, a two-fold application of the CMC operations would leave the data unchanged.

In the description that follows it is assumed that for the encryption process (and the decryption process) the plaintext (or the ciphertext) resides in a data buffer and that CMC operates on the contents of that data buffer such that the final contents of the data buffer constitute the ciphertext (or plaintext). That means that elements 502 and 504 in FIG. 10 can be one and the same register.

CMC is comprised of three successive stages, each of which alters each byte string in the data buffer. When the data buffer is d bytes long and each byte is designated by b(i), for i in the range $0 \leq i < d$:

I. The first stage of CMC is as follows:
 1. Initialize a variable z to zero,
 2. For successive integer values of i in the range $0 \leq i < d$
    a. form a variable q by: q=z$\oplus$ low order byte of i, where $\oplus$ is the bitwise boolean Exclusive-OR operator,
    b. form variable k by: k=TBOX[q],
    c. update b(i) with: b(i)=b(i)+k mod 256, and
    d. update z with: z=b(i)+z mod 256.

II. The second stage of CMC is:
1. for all values of i in the range $0 \leq i < (d-1)/2$:
   $b(i) = b(i) \ominus (b(d-1-i)$ OR $1)$, where OR is the bitwise boolean OR operator.
III. CMC's final stage is the decryption that is inverse of the first stage:
1. Initialize a variable z to zero,
2. For successive integer values of i in the range $0 \leq i < d$
   a. form a variable q by: $q = z \ominus$ low order byte of i,
   b. form variable k by: $k = TBOX[q]$,
   c. update z with: $z = b(i) + z \mod 256$,
   d. update b(i) with: $b(i) = b(i) - k \mod 256$.

Figure 10:
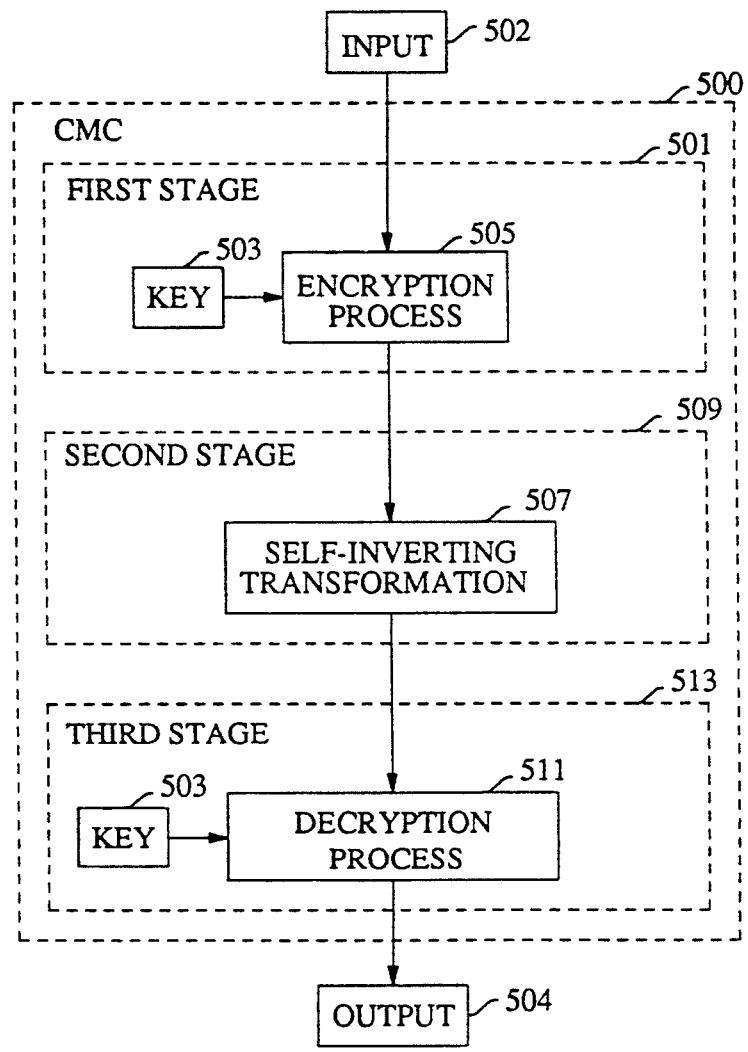
FIG. 10 illustrates the three stage process for encrypting and decrypting selected control and data messages.

The three stage process employed to encrypt and decrypt selected control and data messages is illustrated in FIG. 10. In one preferred embodiment the first stage and the third stage are an autokey encryption and decryption, respectively. An autokey system is a time-varying system where the output of the system is used to affect the subsequent output of the system. For further reference regarding cryptography and autokey systems, see W. Diffie and M. E. Hellman, *Privacy and Authentication: An Introduction to Cryptography*, Proc. of the I.E.E.E., Vol. 67, No. 3, March 1979.

Mobile Unit Apparatus

Figure 11:
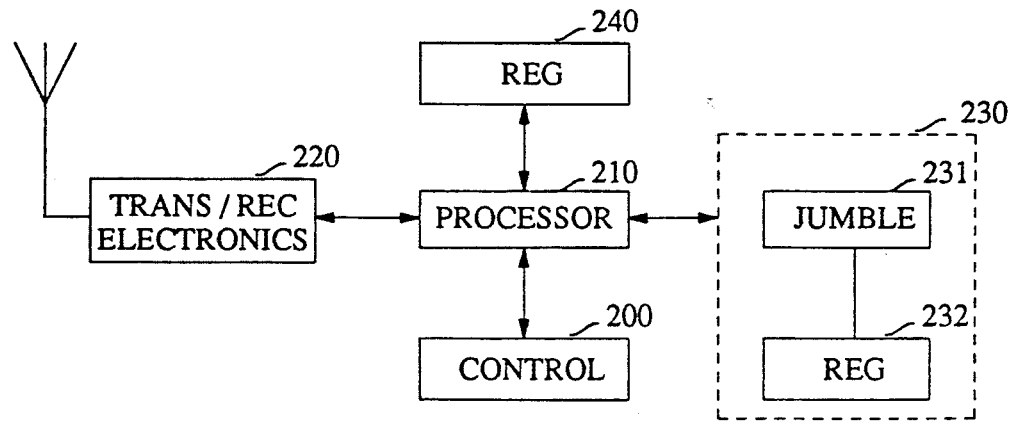
FIG. 11 presents a block diagram of a mobile unit's hardware.

FIG. 11 presents a block diagram of a mobile unit hardware. It comprises a control block 200 which includes (though not illustrated) the key pad of a cellular telephone, the hand set and the unit's power control switch. Control block 200 is connected to processor 210 which controls the workings of the mobile unit, such as converting speech signals to digital representation, incorporating error correction codes, encrypting the outgoing digital speech signals, decrypting incoming speech signals, forming and encrypting (as well as decrypting) various control messages, etc. Block 210 is coupled to block 220 which comprises the bulk of the circuitry associated with transmission and reception of signals. Blocks 200-220 are basically conventional blocks, performing the functions that are currently performed by commercial mobile telephone units (though the commercial units do not carry out encrypting and decrypting). To incorporate the authentication and encryption processes disclosed herein, the apparatus of FIG. 11 also includes a block 240 which comprises a number of registers coupled to processor 210, and a "personality" module 230 that is also coupled to processor 210. Module 230 may be part of the physical structure of a mobile telephone unit, or it may be a removable (and pluggable) module that is coupled to the mobile telephone unit through a socket interface. It may also be coupled to processor 210 through an electromagnetic path, or connection. In short, module 230 may be, for example, a "smart card".

Module 230 comprises a Jumble processor 231 and a number of registers associated with processor 231. Alternately, in another preferred embodiment, only the A-Key is in the module 230. A number of advantages accrue from installing (and maintaining) the A-key, and the MIN1 and MIN2 designations in the registers of module 230, rather than in the registers of block 240. It is also advantageous to store the developed SSD field in the registers of module 230. It is further advantageous include among the registers of module 230 any needed working registers for carrying out the processes of processor 231. By including these elements in module 230, the user may carry the module on his person to use it with different mobile units (e.g. "extension" mobile units) and have none of the sensitive information be stored outside the module. Of course, mobile units may be produced with module 230 being an integral and permanent part of the unit. In such embodiments, Jumble processor 231 may be merged within processor 210. Block 240 stores the unit's ESN designation and the various RAND sequences that are received.

Although the above disclosure is couched in terms of subscriber authentication in a cellular telephony environment, and that includes personal communication networks which will serve portable wallet sized handsets, it is clear that the principles of this invention have applicability in other environments where the communication is perceived to be not sufficiently secure and where impersonation is a potential problem. This includes computer networks, for example.

We claim:

1. A method, carried out by a customer unit that maintains a code sequence, for establishing a communications channel with a base station, comprising the steps of:
   receiving from the base station a digital signal sequence;
   developing a string which includes the code sequence, the digital signal sequence, and a sequence of bits that is characteristic of the customer unit;
   hashing the string to develop a hashed string; and
   using the hashed string in further communications with the base station.

2. The method of claim 1 wherein said sequence of bits that is characteristic of the customer unit includes a bit string that is unique to the customer unit hardware (ESN designation) and a bit string that is assigned to said unit as a customer of a service provider (MIN designation).

3. The method of claim 1 wherein said step of developing the hashed string is carried out pursuant to a directive from said base station.

4. The method of claim 1 including a step of initiating the steps of receiving, developing, hashing and using said hashed string when said base station desires to direct said customer unit to create a replacement for said hashed string.

5. The method of claim 1 further comprising the step of enciphering customer data signals with the aid of a portion of said hashed string.

6. The method of claim 1 wherein said step of using the hashed string in further communication employs the hashed string in a plurality of communications sessions through the communication channel.

7. The method of claim 1 further comprising the steps of:
   creating a challenge string,
   transmitting the challenge string,
   forming an authentication string that comprises the challenge string, said sequence of bits that is characteristic of the customer unit, and at least a portion of the hashed string;
   hashing the authentication string to form a hashed authentication string;
   receiving a verification string in response to said step of transmitting the challenge string;
   comparing the received verification string with the hashed authentication string; and
   transmitting results of said step of comparing.

8. The method of claim 1 further comprising a step of verifying that the base station recognizes the hashed string developed by said customer unit to be a valid hashed string.

9. The method of claim 8 wherein said step of verifying comprises the steps of:
developing a challenge sequence;
sending said challenge sequence to said base station;
forming an authentication string from a concatenation of said challenge sequence, said hashed string and selected other information;
hashing said authentication string to form a hashed authentication string;
receiving a hashed signal from said base station that is related to said challenge sequence sent to said base station;
comparing said hashed authentication string with said hashed signal; and
reporting to said base station results of said step of comparing.

10. A method, carried out by a customer unit that maintains a code sequence, for establishing a communications channel with a base station, comprising the steps of:
receiving from the base station a digital signal sequence;
developing a string which includes the digital signal sequence, a sequence of bits that is characteristic of said customer unit and a key derived from the code sequence;
hashing the string to develop a hashed string; and
sending the hashed string to the base station.

11. The method of claim 10 wherein said base station has no knowledge of said code sequence.

12. The method of claim 10 wherein the sequence of bits is nonsecret.

13. The method of claim 10 wherein the customer unit is mobile and the base station is non-mobile.

14. The method of claim 10 wherein the established communication channel is a wireless communication channel.

15. The method of claim 10 wherein the established communication channel is a cellular radio communication channel.

16. The method of claim 10 further comprising the steps of determining that the mobile customer unit has entered the jurisdiction of the base station.

17. The method of claim 10 wherein said step of sending the hashed string also sends at least a portion of said string.

18. The method of claim 10 including a step of initiating the steps of receiving, developing, hashing and sending said hashed string when said customer unit desires to initiate a call.

19. The method of claim 10 including a step of initiating the steps of receiving, developing, hashing and sending said hashed string when said base station desires to activate said customer unit to receive a call.

20. The method of claim 10 including a step of initiating the steps of receiving, developing, hashing and sending said hashed string when said base station desires to re-authenticate said customer unit.

21. A method, carried out by a customer unit that maintains a code sequence, for establishing a communications channel with a base station that has no knowledge of said code sequence, comprising the steps of:
(a) receiving from said base station a digital signal sequence;
(b) developing a string which includes
  (1) a substring containing a sequence of bits that is characteristic of said customer unit,
  (2) a substring that is related to a specified action to be taken by said customer unit, which substring is selected from a set comprising
    (i) a null string,
    (ii) a string of bits corresponding to a number assigned to said customer unit, and
    (iii) a string corresponding to the number of another customer unit to which connection is sought,
  (3) a substring containing said digital signal sequence, and
  (4) a substring containing a key derived from said code sequence;
(c) hashing said string to develop a hashed string; and
(d) sending said hashed string to said base station.

22. The method of claim 21 further comprising a step of receiving from said base station an indication of the action to be taken by said customer unit.

23. The method of claim 21 wherein the sequence of bits that is characteristic of the customer units comprises the customer unit's phone number.

24. The method of claim 21 wherein the sequence of bits that is characteristic of the customer units comprises the customer unit's electronic serial number.

25. A customer unit for communicating with a system, said customer unit including first means (200) for developing call initiation control signals and call progress control signals second means (210, 230, 240) responsive to said call initiation control signals and call progress control signals for establishing and maintaining a communication channel with said system in accordance with a protocol third means (200) for creating data signals, and fourth means (220) for applying the data signals and the call control signals to said communication channel, said second means CHARACTERIZED BY:
a processor responsive to said third means and said fourth means;
means A (a register in block 240) for developing an identifier signal that is unique to said customer unit;
means B for storing (240) a temporary string signal (RAND) received from said system;
means C for storing (232) an identifier signal (MIN) supplied by an owner of said system, a code sequence key signal (A-key) supplied by said owner of said system, an authentication key signal (SSD-A), and a speech encryption key signal (SSD-B);
means D (231) responsive to said processor for hashing an applied string and developing thereby a hashed output;
means E for applying said authentication key to means D.

26. The customer unit of claim 25 wherein said temporary string maintained in means B is repetitively updated from a signal provided by said fourth means.

27. The customer unit of claim 26 wherein the time duration between successive updates of said temporary string is less than the expected time duration between the application of call initiation control signals.

28. The customer unit of claim 25 wherein said processor, upon receipt of a signal from said fourth means that directs the creation of a new authentication key signal and a new speech key signal, applies hashed output signals of means D to means C to modify said authentication key signal and said speech key signal.

29. The customer unit of claim 28 wherein the hashed output of means D is a multi-bit binary word, one portion of said binary word constitutes said authentication key signal, and another portion of said binary word constitutes said speech key signal.

30. The customer unit of claim 25 wherein at least the portion of means C that stores the code sequence key signal is in a removable module.

31. The customer unit of claim 30 wherein said module is adapted to be connected to said processor via electrical contacts.

32. The customer unit of claim 30 wherein said module is adapted to be connected to said processor via electromagnetically coupled connections.

33. A method carried out by a communications system for establishing a communications channel with a customer unit comprising the steps of:
   maintaining an authentication key of said customer unit;
   receiving a first hashed authentication string from said customer unit;
   forming a local authentication string by combining said authentication key with other information;
   hashing said local authentication string to form a local hashed authentication string; and
   comparing said local hashed authentication string with the first hashed authentication string.

34. The method of claim 33 further comprising the step of maintaining a designation of said customer unit that is provided to said system and is unique to said unit (MIN) and a code sequence designation of said customer unit (A-key).

35. The method of claim 34 further comprising the step of maintaining an ESN designation of said unit.

36. The method of claim 35 further comprising the steps of:
   developing a number;
   transmitting said number;
   developing said authentication key by hashing a string comprising said number, said ESN designation and said code sequence designation of said customer unit in accordance with a hashing function.

37. The method of claim 33 further comprising the steps of
   developing a number; and
   broadcasting said number to said customer unit.

38. The method of claim 37 wherein said number is pseudorandom.

39. The method of claim 37 wherein said number is random.

* * * * *